US012220936B2

(12) United States Patent
Sølling

(10) Patent No.: US 12,220,936 B2
(45) Date of Patent: Feb. 11, 2025

(54) BOOK OR BOOKLET COVER AND A METHOD OF MAKING A BOOK OR BOOKLET COVER

(71) Applicant: SCANAVO A/S, Taastrup (DK)

(72) Inventor: Tino Sølling, Solrød Strand (DK)

(73) Assignee: SCANAVO A/S, Taastrup (DK)

( * ) Notice: Subject to any disclaimer, the term of this patent is extended or adjusted under 35 U.S.C. 154(b) by 0 days.

(21) Appl. No.: 18/042,560

(22) PCT Filed: Aug. 25, 2021

(86) PCT No.: PCT/EP2021/073461
§ 371 (c)(1),
(2) Date: Feb. 22, 2023

(87) PCT Pub. No.: WO2022/043361
PCT Pub. Date: Mar. 3, 2022

(65) Prior Publication Data

US 2023/0322009 A1 Oct. 12, 2023

(30) Foreign Application Priority Data

Aug. 28, 2020 (DK) ............................ PA202070556

(51) Int. Cl.
*B42D 3/02* (2006.01)
*B21D 11/10* (2006.01)
(Continued)

(52) U.S. Cl.
CPC ................ *B42D 3/02* (2013.01); *B21D 11/10* (2013.01); *B21D 39/02* (2013.01); *B42B 5/06* (2013.01);
(Continued)

(58) Field of Classification Search
CPC . B42D 3/02; B42D 3/004; B42D 3/08; B21D 39/02; B21D 39/021; B42B 5/06;
(Continued)

(56) References Cited

U.S. PATENT DOCUMENTS 1,508,733 A 9/1924 Trabold
2,006,824 A * 7/1935 Cavalero .................. B42D 3/08
281/36
(Continued)

FOREIGN PATENT DOCUMENTS

CN 206501595 U 9/2017
DE 10 2016 005 362 A1 11/2017
(Continued)

OTHER PUBLICATIONS

FR1169472A English Translation (Year: 1958).*
(Continued)

*Primary Examiner* — Kyle R Grabowski
(74) *Attorney, Agent, or Firm* — Crowell & Moring LLP; John C. Freeman

(57) ABSTRACT

A method of making a book or booklet cover including placing a first face of a sheet-like information carrier on a first side of a metal sheet that extends beyond one edge of the sheet-like information carrier. The method including bending a portion of the metal sheet along an edge thereof, for the portion to elastically press on the sheet-like information carrier.
A book or booklet cover including a metal sheet supporting a sheet-like information carrier, which sheet-like information carrier has a first face and an opposite second face, with the second face on a first side of the metal sheet, the metal sheet-having a portion extending beyond at least one edge of the sheet-like information carrier, where the portion of the
(Continued)

metal sheet has a rounded bend along an edge thereof, the portion elastically pressing against the sheet-like information carrier.

4 Claims, 6 Drawing Sheets

(51) Int. Cl.

| | |
|---|---|
| ***B21D 39/02*** | (2006.01) |
| ***B42B 5/06*** | (2006.01) |
| ***B42D 1/06*** | (2006.01) |
| ***B42D 3/00*** | (2006.01) |
| ***B42D 3/08*** | (2006.01) |

(52) U.S. Cl.
CPC ............... *B42D 1/06* (2013.01); *B42D 3/004* (2013.01); *B42D 3/08* (2013.01)

(58) Field of Classification Search
CPC ...... B42F 1/04; B42F 1/06; B42F 1/12; B42F 9/001; B42F 9/008; A47G 1/0611; A47G 1/0633
USPC ........................................................ 412/3, 17
See application file for complete search history.

(56) References Cited

U.S. PATENT DOCUMENTS

| | | | | | |
|---|---|---|---|---|---|
| 2,014,723 | A * | 9/1935 | Carlo | B42F 1/06 | 24/546 |
| 2,018,826 | A * | 10/1935 | Zell | B42D 3/045 | 69/21 |
| 2,711,909 | A * | 6/1955 | Duffie | B42F 9/001 | 281/45 |
| 3,128,220 | A * | 4/1964 | Gracer | B21D 39/02 | 285/236 |
| 3,164,196 | A | 1/1965 | Dolney | | |
| 4,114,240 | A | 9/1978 | Nackenson | | |
| 4,452,471 | A | 6/1984 | Wessner | | |
| 5,538,135 | A | 7/1996 | Hexter, Jr. | | |
| 5,970,777 | A | 10/1999 | Hunt et al. | | |
| 6,042,319 | A * | 3/2000 | Hoffman | B42B 5/06 | 412/34 |
| 7,251,875 | B2 * | 8/2007 | Blumberg | B42D 5/046 | 412/38 |
| 2004/0012191 | A1 | 1/2004 | Stark | | |
| 2007/0012583 | A1 | 1/2007 | Choi et al. | | |
| 2020/0111393 | A1 | 4/2020 | Ruszczyc et al. | | |
| 2021/0122180 | A1 | 4/2021 | Normann et al. | | |

FOREIGN PATENT DOCUMENTS

| | | | | |
|---|---|---|---|---|
| DK | 179915 | B1 | 10/2019 | |
| EP | 0 802 068 | A2 | 10/1997 | |
| EP | 2511103 | A1 * | 10/2012 | B21D 19/08 |
| FR | 1169472 | A * | 12/1958 | |
| GB | 157520 | A * | 1/1921 | |
| GB | 2061870 | A | 5/1981 | |
| GB | 2 249 859 | A | 5/1992 | |
| GB | 2320898 | A * | 7/1998 | A47G 1/0633 |
| KR | 10-2014-0058453 | A | 5/2014 | |

OTHER PUBLICATIONS

International Search Report dated Dec. 22, 2021 out of PCT Priority Application PCT/EP2021/073461 (Three pages).
Written Opinion dated Dec. 22, 2021 out of PCT Priority Application PCT/EP2021/073461 (Five pages).
International Preliminary Report on Patentability dated Aug. 9, 2022 out of PCT Priority Application PCT/EP2021/073461 (Eight pages).
Office Action dated Mar. 4, 2021 (Eight pages) out of Danish priority Patent Application PA 2020 70556
Communication Under Rule 71(3) EPC dated Mar. 7, 2024 (33 pages) out of corresponding European Application No. 21 769 923.0.
First Office Action (6 pages) dated Jun. 11, 2024 out of related Danish application PA 2023 01194.

* cited by examiner

BOOK OR BOOKLET COVER AND A METHOD OF MAKING A BOOK OR BOOKLET COVER

This application is a National Stage application of International Application No. PCT/EP2021/073461, filed Aug. 25, 2021, wherein the above-mentioned International Application claims the benefit under 35 U.S.C. § 119(a) of the filing date of Aug. 28, 2020 of Danish Patent Application No. PA202070556, the entire contents of each of which are incorporated herein by reference.

BACKGROUND OF THE INVENTION

FIELD OF THE INVENTION

The present invention relates to a method of making a book or booklet cover including a metal sheet supporting a sheet-like information carrier.

The invention further relates to a book or booklet cover including a metal sheet supporting a sheet-like information carrier, which sheet has a first face and an opposite second face, with the first face of the sheet on a first side of a metal sheet, the metal sheet having a portion that extends beyond at least one edge of the sheet.

RELATED ART

Among the many variations within the field of sheet-like information carriers there are a couple that should be mentioned in this context.

The traditional book including a cover and a number of content pages is very well-known.

Plastic boxes where a printed inlay is loosely placed inside the box, often together with other items, is likewise a well-known solution.

GB 2249859 discloses a media packaging where on the outside a number of leaves are placed for containing and displaying various information or artwork.

Commonly known problems related to these information holding articles are the need to individualize the cover for the book in order to achieve the right dimensions and the ability to maintain the sides of the cover essentially parallel when the book is closed or have the inlay loosely placed in the cover.

DK 179915 B1 discloses an information holding article that may be manufactured in a standard size and being adapted for variations in the content and hence reduce the effort of individualising the information holding article. The information holding article including an inner part and an outer part, where the inner part includes a number of pages adapted for holding printed information and optionally includes one or more parts for holding an information carrying medium or an object, where the outer part includes a plastic cover with a first and a second side element and where a back element is provided between the first and the second side element an being adapted for mutual pivotal movement between the back element and the first and/or the second side element, where the inner part is connected to the plastic cover at one of the first side element, the second side element or the back element, where the two side elements are spaced apart when the inner part is connected to the plastic cover, where the pages of the inner part has a thickness less than the width of the back element, and where the inner part is adapted to fit a the width of the back element by including, together with the pages, a thickness correcting element to the inner part. Here the metal cover is fastened to the book by gluing.

OBJECTIVE OF THE INVENTION

An object of the present invention is to therefore provide for a sheet-like information carrier that may be manufactured in a standard size and being adapted for variations in the content and hence reduce the effort of individualizing the information holding article without need for using glue for attaching a cover in shape of a metal sheet to a sheet-like information carrier.

This is achieved by a method of making a book or booklet cover including a metal sheet supporting a sheet-like information carrier including the steps of: placing a first face of the sheet-like information carrier on a first side of a metal sheet, which metal sheet extends et least beyond one edge of the sheet; bending in a rounding way a portion of the metal sheet along an edge thereof, for the portion to bear against and to elastically press on the sheet, thereby forming the book or booklet cover, wherein the edge is bent at an angle of 270 degrees or more in relation to a metal sheet with an unbent edge.

By bending an edge of the metal sheet without bending it into a sharp bend in such a way the an outmost part or portion of the sheet along an edge is pressed against a surface of the first face of the sheet-like information carrier, holding the second face of the sheet-like information carrier against the first side of the metal sheet.

The bent portion of the metal sheet can be bend in a radius, which bending radius is greater than a thickness of the metal sheet in such a way that the bent portion bended along the edge elastically presses against the surface of the first face of the sheet-like information carrier, holding the second face of the sheet-like information carrier against the first side of the metal sheet.

Hereby is achieved that the metal sheet can be fastened to the sheet-like information carrier without use of glue or other kind of adhesive.

In an aspect of the method the edge is bent at an angle a being in a range between 180 and 270 degrees in relation to a metal sheet with an unbent edge.

Hereby is achieved that it is possible for a first edge part of the edge of the metal sheet to carve into the material of the sheet-like information carrier.

In another aspect the edge is bent at an angle a being 270 degrees in relation to a metal sheet with an unbent edge.

Hereby is achieved that it is possible to provide a contact area corresponding to a material thickness of the metal sheet pressing against the first face of the sheet-like information carrier.

In another aspect, the edge is bent at an angle a being in a range between 270 and 360 degrees in relation to a metal sheet with an unbent edge.

Hereby is achieved that it is possible for a second edge part of the edge of the metal sheet to carve into the material of the sheet-like information carrier.

In another aspect the edge is bent at an angle a being 360 degrees in relation to a metal sheet with an unbent edge.

Hereby is achieved that it is possible to provide a resilient contact area of the second edge part of the portion of the metal sheet pressing against the first face of the sheet-like information carrier.

In another aspect the edge is bent at an angle a being more than 360 degrees in relation to a metal sheet with an unbent edge.

Hereby is achieved that it is possible to provide a resilient contact of the portion of metal sheet pressing against the first face of the sheet-like information carrier.

Also provided is a book or booklet cover including a metal sheet supporting a sheet-like information carrier, which sheet has a first face and an opposite second face, with the first face of the sheet on a first side of a metal sheet, the metal sheet having a portion that extends beyond at least one edge of the sheet, where the portion of the metal sheet has a rounded bend along an edge thereof, the portion elastically pressing against the sheet, and that the metal sheet has an edge bent at an angle a of 270 degrees or more in relation to a metal sheet with an unbent edge.

In an aspect of the book or booklet cover, the metal sheet has an edge bent at an angle a in a range between 180 and 270 degrees in relation to a metal sheet with an unbent edge.

Hereby is achieved that it is possible for a first edge part of the edge of the metal sheet to carve into the material of the sheet-like information carrier.

In another aspect, the metal sheet has an edge bent at an angle being 270 degrees in relation to a metal sheet with an unbent edge.

Hereby is achieved that it is possible to provide a contact area corresponding to a material thickness of the metal sheet pressing against the first face of the sheet-like information carrier.

In another aspect, the metal sheet has an edge bent at an angle a in a range between 270 and more than 360 degrees in relation to a metal sheet with an unbent edge.

Hereby is achieved that it is possible to provide a resilient contact of the portion of metal sheet pressing against the first face of the sheet-like information carrier or possible for a second edge part of the edge of the metal sheet to carve into the material of the sheet-like information carrier.

Effects and features of the different embodiments are to a large extent analogous to those described above in connection with the first embodiment.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing embodiments only, and is not intended to be limiting. It should be noted that, as used in the specification and the appended claim, the articles “a”, “an”, “the”, and “said” are intended to mean that there are one or more of the elements unless the context explicitly dictates otherwise. Thus, for example, reference to “a unit” or “the unit” may include several devices, and the like. Furthermore, the words “comprising”, “including”, “containing” and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

Figure 9:
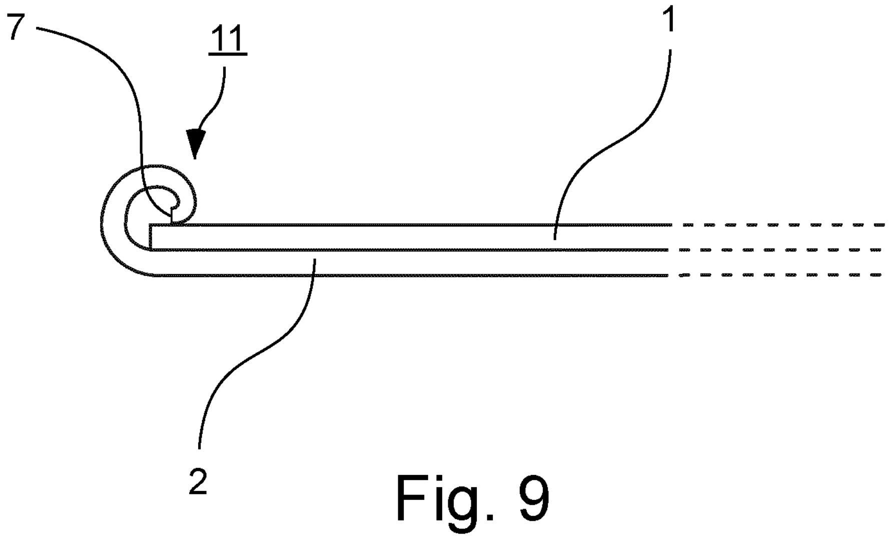
Figure 10:
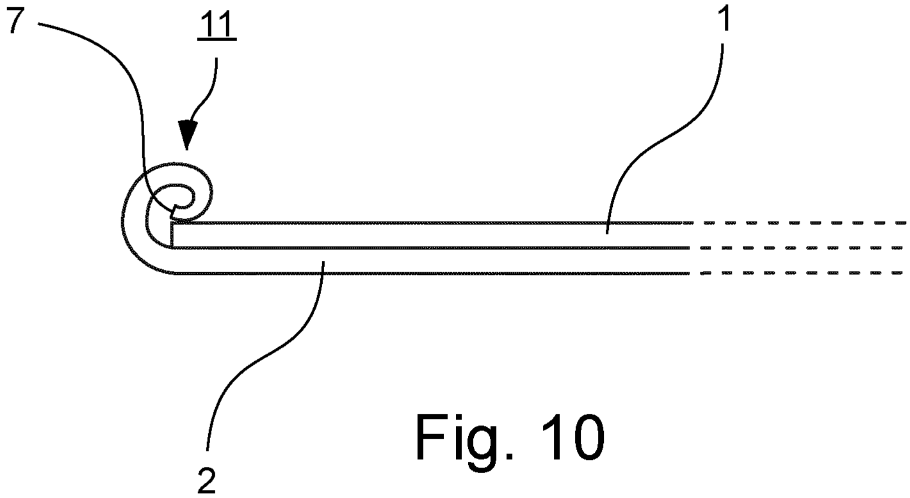

FIG. 9 shows schematically another embodiment of the sheet-like information carrier placed on a metal sheet with the rounded edge of the metal sheet pressing against the sheet-like information carrier; and FIG. 10 shows schematically another embodiment of the sheet-like information carrier placed on a metal sheet with the rounded edge of the metal sheet pressing against the sheet-like information carrier.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

A method of making a book or booklet cover including a metal sheet 2 supporting a sheet-like information carrier 1 can be carried out as follows.

A first face 3 of the sheet-like information carrier 1 is placed on a first side 5 of the metal sheet 2, in such a way that the metal sheet 2 extends at least beyond one edge 10 of the sheet 1. Then a portion 11 of the metal sheet 2 is bent in a rounding way along an edge of the metal sheet 2, for the portion 11 to bear against and to elastically press on said sheet-like information carrier 1. In some embodiments this is sufficient to hold the sheet-like information carrier 1 firmly in the metal sheet 2 by the pressure of the bent portion 11. In other embodiments abutting edges of the metal sheet 2 can be bent to more firmly hold the sheet-like information carrier 1 within the metal sheet 2.

When bending in a rounding way a portion 11 of the metal sheet 2 along an edge thereof, for the portion 11 to bear against and to elastically press on the sheet 1 the book or booklet cover is formed, where the edge 7 is bent at an angle of 270 degrees or more in relation to a metal sheet 2 with an unbent edge.

In an embodiment of the method the edge 7 is bent at an angle a being in a range between 180 and 270 degrees in relation to a metal sheet 2 with an unbent edge 7, with the effect that a first edge part 8 of the edge 7 of the metal sheet 2 can carve into the material of the sheet-like information carrier 1, providing a holding force.

In another embodiment, the edge 7 is bent at an angle a being 270 degrees in relation to a metal sheet 2 with an unbent edge 7, with the effect that it is possible to provide a contact area corresponding to a material thickness of the metal sheet 2 pressing against a second face 4 of the sheet-like information carrier 1, thereby squeezing the sheet-like information carrier 1 between the edge 7 of the rounded portion 11 of the metal sheet 2 and the first side 5 of the metal sheet 2, providing a holding force.

In another embodiment, the edge 7 is bent at an angle a being in a range between 270 and 360 degrees in relation to a metal sheet 2 with an unbent edge 7, with the effect that it is possible for a second edge part 9 of the edge 7 of the metal sheet 2 to carve into the material of the sheet-like information carrier 1, providing a holding force.

In another embodiment, the edge 7 is bent an angle a being 360 degrees in relation to a metal sheet 2 with an unbent edge 7, with the effect that it is possible to provide a resilient contact area of the second edge part 9 of the portion 11 of the metal sheet 2 pressing against the second face 4 of the sheet-like information carrier 1, providing a holding force.

In another embodiment, the edge 7 is bent at an angle a being more than 360 degrees in relation to a metal sheet 2 with an unbent edge 7, with the effect that it is possible to provide a resilient contact of the portion 11 of the metal sheet 2 pressing against the first face 4 of the sheet-like information carrier 1, providing a holding force.

An example of a machine with a tool for bending a portion of a metal sheet in a rounded way around an edge portion of a sheet-like information carrier is shown in FIGS. 1 to 4, showing different stages during the process.

This is just for mentioning one example, different tools may perform the same bend.

Figure 1:
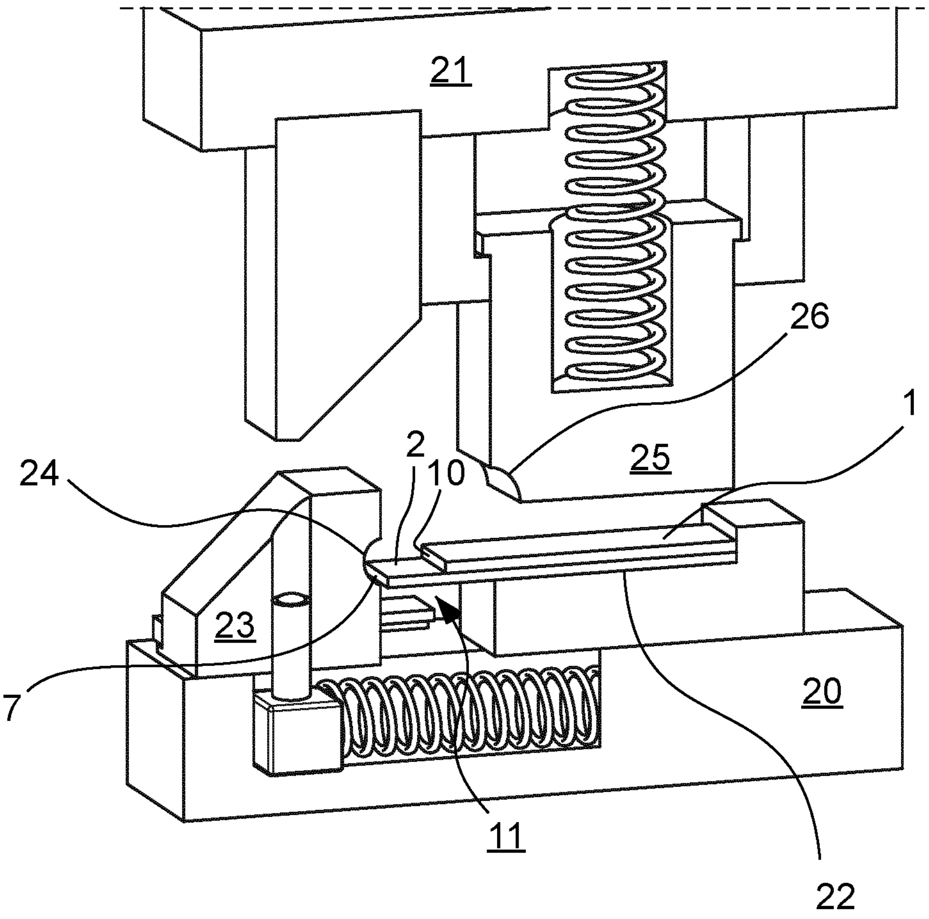
FIG. 1 shows an example of a machine with a tool capable of bending portion of a flat article in a rounded way along an edge of another flat article, where the two flat articles are placed in the tool.

In FIG. 1, the tool includes a lower part 20 and an upper part 21, the lower part 20 including a support surface 22 on which the articles 1, 2 for forming the book or booklet cover is placed and a first tool part 23 having a groove 24 for performing the rounded bending of the portion 11 of the metal sheet 2. The upper part 21 includes a second tool part 25 including an inwardly rounded edge 26 for completing the rounding of the portion 11 of the metal sheet 2, when the tool parts 23, 25 are put together.

When moving the upper part 21 towards the lower part 20, the first tool part 23 is moved towards the edge 7 of the metal sheet 2 and the portion 11 is forced along the rounding in the groove 24 thereby being bent in a rounded way. The traveling distance of the first tool part 23 determines how much of the portion 11 to be bent and the dimension of the groove determines the dimension of the bent edge portion.

Figure 2:
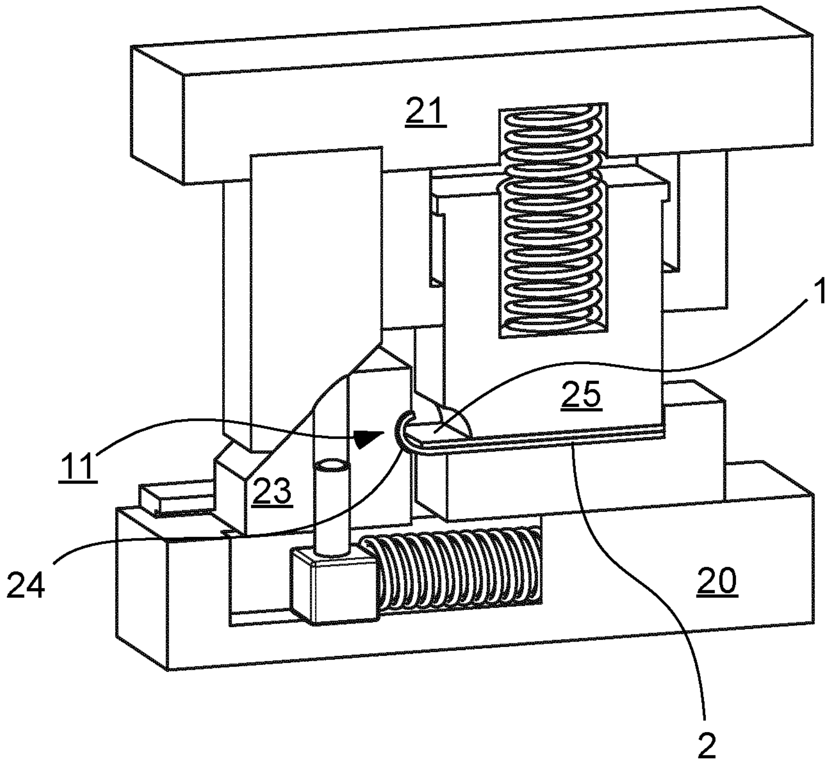
FIG. 2 shows the machine of FIG. 1 with the tool beginning bending the portion rounding the edge of the first flat article around the edge of the other article.

In FIG. 2, the first tool part 23 is moved towards the second tool part 25 and the portion 11 of the metal sheet 2 is beginning the bending.

Figure 3:
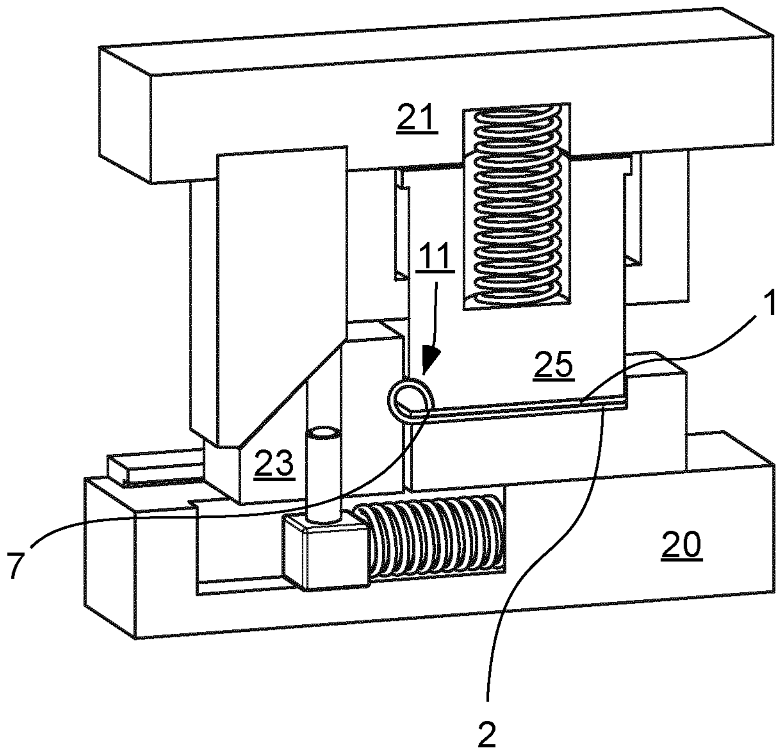
FIG. 3 shows the machine of FIG. 1 with the tool finishing rounding the edge of the first flat article around the edge of the other article.
Figure 4:
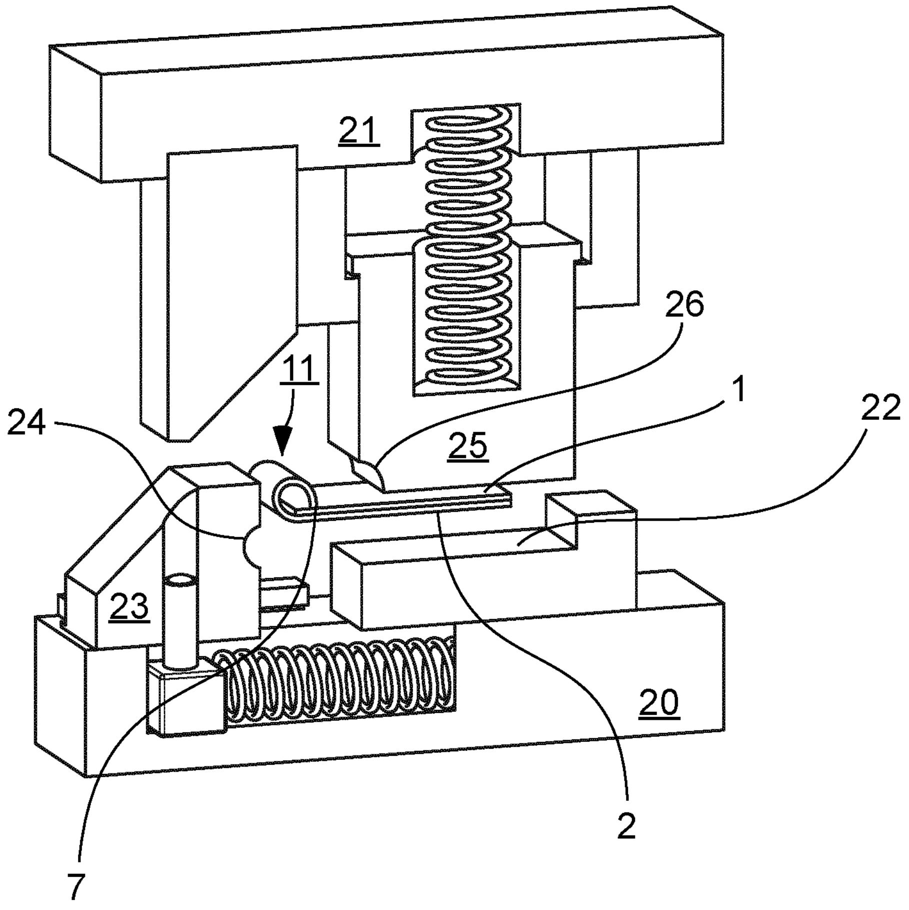
FIG. 4 shows the machine of FIG. 1 with the tool releasing an item with a finished rounding the edge of the first flat article around the edge of the other article.

In FIG. 3, the bending is completed and in FIG. 4, the tool parts 23, 25 are moved apart from each other and the end product can be seen.

Figure 5:
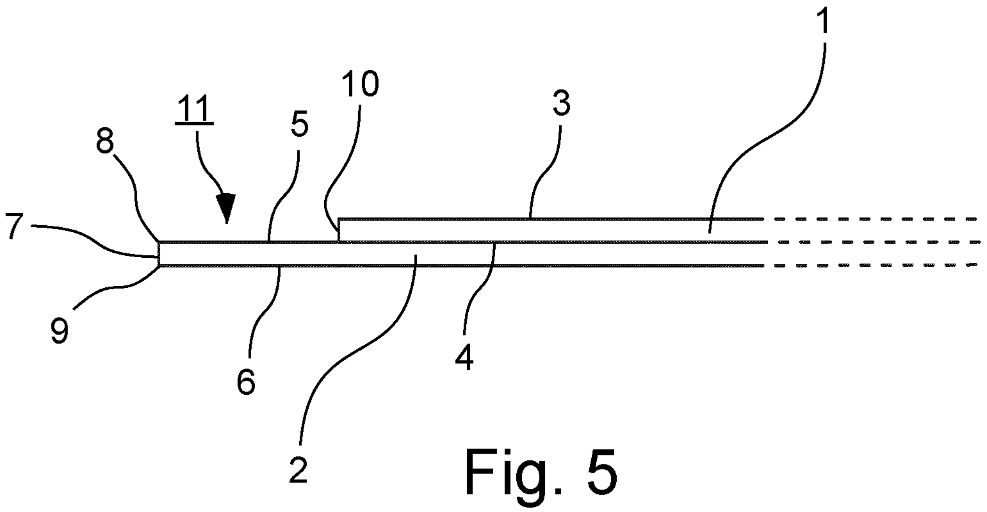
FIG. 5 shows schematically an embodiment of a sheet-like information carrier placed on a metal sheet before processing the portion of the metal sheet.

FIG. 5 shows a sheet-like information carrier 1 placed on a metal sheet 2 before being joined in an edge portion. The sheet 1 includes a first face 3 and an opposite second face 4, where the first face is placed against a first side 5 of the metal sheet 2. The metal sheet 2 has an opposite second side 6, which second side rest on the support surface 22 of the tool during bending. A portion 11 of the metal sheet 2 includes an edge 7 having a first edge part 8 and a second edge part 9. The sheet 1 shows an edge 10.

The product obtained by completion of the process is a book or booklet cover including a metal sheet 2 supporting a sheet-like information carrier 1, which sheet 1 has a first face 3 and an opposite second face 4, with the first face 3 of the sheet 1 on a first side 5 of a metal sheet 2, the metal sheet 2 having a portion 11 that extends beyond at least one edge 10 of the sheet 1, where the portion 11 of the metal sheet 2 has a rounded bend along an edge thereof, the portion 11 elastically pressing against the sheet 1.

Figure 7:
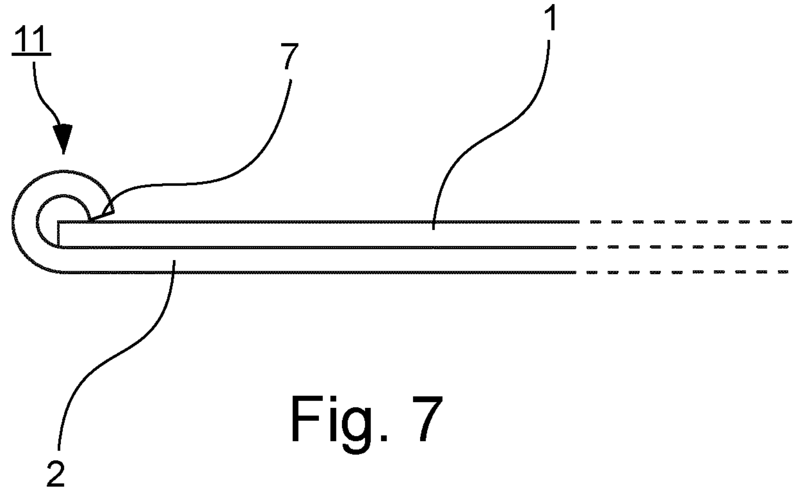
FIG. 7 shows schematically an embodiment of the sheet-like information carrier placed on a metal sheet with the rounded edge of the metal sheet pressing against the sheet-like information carrier.

In an embodiment as shown in FIG. 7, the metal sheet 2 has an edge 7 which is bent at an angle a in a range between 180 and 270 degrees in relation to a metal sheet 2 with an unbent edge 7. Hereby the first edge 8 carves into the sheet 1 forming a better grip than if the edge 7 of the metal sheet 2 was just folded around the edge of the sheet 1.

Figure 6:
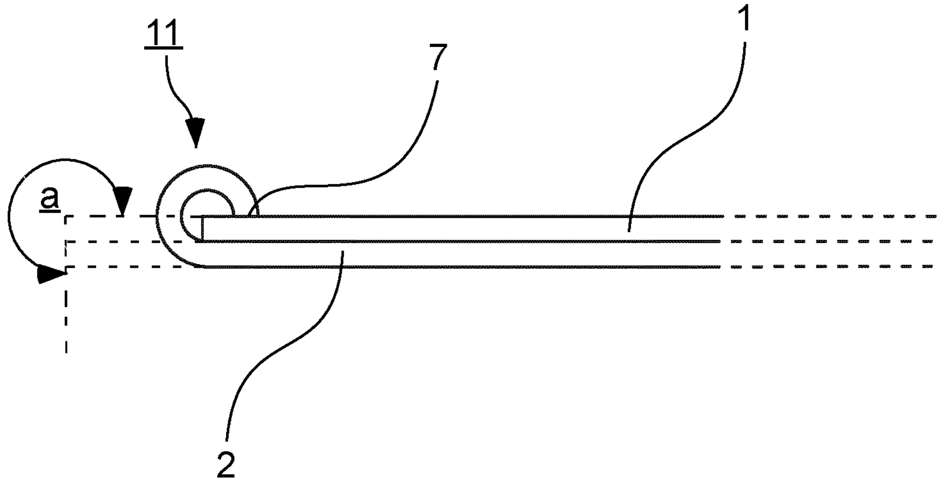
FIG. 6 shows schematically the sheet-like information carrier of FIG. 5 placed on a metal sheet with the rounded edge of the metal sheet pressing against the sheet-like information carrier.

In an embodiment as shown in FIG. 6, the metal sheet 2 has an edge 7 which is bent at an angle a being 270 degrees in relation to a metal sheet 2 with an unbent edge 7. The angle a mentioned in the different embodiments are indicated in FIG. 6, which angle a refers to an angular position of the edge 7 compared to an edge 7 of a sheet with an unbent edge.

Figure 8:
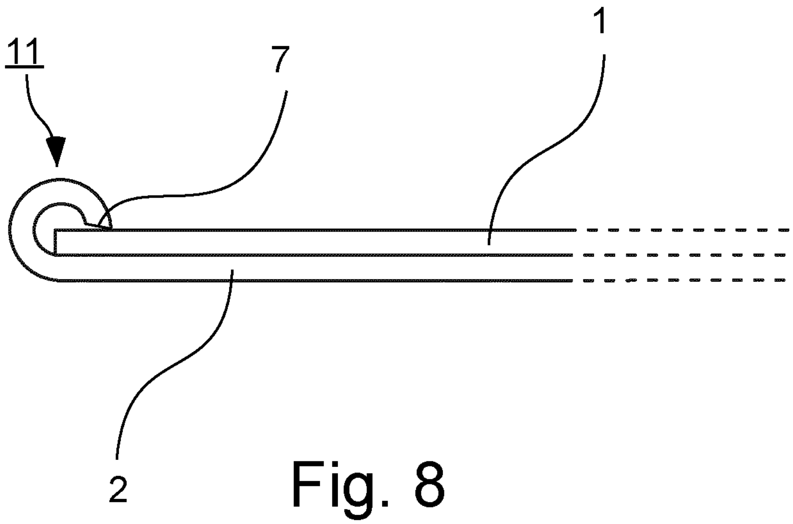
FIG. 8 shows schematically another embodiment of the sheet-like information carrier placed on a metal sheet with the rounded edge of the metal sheet pressing against the sheet-like information carrier.

In embodiments as shown in FIGS. 8, 9 and 10, the metal sheet 2 has an edge 7 which is bent at an angle a being more than 360 degrees (FIG. 10), preferable 360 degrees (FIG. 9), more preferable in a range between 270 and 360 degrees (FIG. 8) in relation to a metal sheet 2 with an unbent edge 7.

As shown in FIG. 8, the second edge 9 carves into the sheet 1 forming a better grip than if the edge 7 of the metal sheet 2 was just folded around the edge of the sheet 1.

Hereby it is possible to retain the sheet-like information carrier 1 in relation to a metal sheet 2, where a portion 11 that extends beyond at least one edge 10 of the sheet 1, where the portion 11 of the metal sheet 2 has a rounded bend along an edge thereof, the portion 11 elastically pressing against the sheet 1 and thereby attaching the two parts together without need to use any adhesive material.

The first side or page of the sheet-like information carrier can be of same thickness as the rest of the pages in the book or booklet, or the first side or page can be thicker than the rest of the pages in the book or booklet. The same applies to the last side or page.

Bending in a rounding way should be understood as when the edge of the metal sheet is bent, the side which is bent around the bending edge is rounded and does not form a plane inner surface. Hereby is achieved that the edge which is now bent more than 180 degrees in relation to its initial position will be able to press against a sheet or the like on which the metal sheet 2 is placed to cover, without the inner portion of the bent edge pressing against the inner sheet. The part forming contact with the inner sheet is the edge of the metal sheet 2 or the corner lines of the edge.

In FIGS. 6 to 10 it is shown that a hollow channel is formed in the edge portion of the cover.

The person skilled in the art realizes that the present disclosure is not limited to the preferred embodiments described above. The person skilled in the art further realizes that modifications and variations are possible. Additionally, variations to the disclosed embodiments can be understood and effected by the skilled person in practicing the disclosure, from a study of the drawings, and the disclosure.

The invention claimed is:

1. A method of making a book or booklet cover including a metal sheet supporting a sheet-like information carrier, the method comprising:

placing a first face of a sheet-like information carrier on a first side of a metal sheet, which metal sheet extends at least beyond an edge of the sheet-like information carrier;

bending in a rounding way a portion of the metal sheet along an edge of the metal sheet, to form the portion of the metal sheet comprising the edge of the metal sheet so as to have a continuous round contour without flat surfaces and sharp bends, for the portion to bear against and to elastically press on a second face of the sheet-like information carrier, thereby forming a book or booklet cover, wherein the edge of the metal sheet is bent at an angle of 270 degrees or more in relation to the edge of the metal sheet prior to being bent.

2. The method according to claim 1, wherein the edge of the metal sheet is bent at an angle (a) being in a range between 270 and 360 degrees in relation to the edge of the metal sheet prior to being bent.

3. The method according to claim 1, wherein the edge of the metal sheet is bent at an angle (a) being 360 degrees in relation to the edge of the metal sheet prior to being bent.

4. The method according to claim 1, wherein the edge of the metal sheet is bent at an angle (a) being more than 360 degrees in relation to the edge of the metal sheet prior to being bent.

* * * * *